(12) United States Patent
Guerra

(10) Patent No.: US 7,461,759 B2
(45) Date of Patent: Dec. 9, 2008

(54) FORK BASED TRANSPORT STORAGE SYSTEM FOR PHARMACEUTICAL UNIT OF USE DISPENSER

(75) Inventor: Lawrence E. Guerra, Mission, KS (US)

(73) Assignee: Scriptpro LLC, Mission, KS (US)

( * ) Notice: Subject to any disclaimer, the term of this patent is extended or adjusted under 35 U.S.C. 154(b) by 238 days.

(21) Appl. No.: 11/196,667

(22) Filed: Aug. 3, 2005

(65) Prior Publication Data

US 2006/0016824 A1     Jan. 26, 2006

(51) Int. Cl.
G07F 11/00     (2006.01)

(52) U.S. Cl. .................. 221/93; 221/192; 221/209; 198/463.3; 198/774.1

(58) Field of Classification Search .............. 198/463.3, 198/774.1; 221/209, 192, 93
See application file for complete search history.

(56) References Cited

U.S. PATENT DOCUMENTS

| | | | |
|---|---|---|---|
| 341,045 A | 11/1886 | Igel et al. |
| 1,128,561 A | 2/1915 | Webendorfer |
| 2,088,038 A | 7/1937 | Scott et al. |
| 2,137,501 A | 11/1938 | Myers |
| 2,178,000 A | 10/1939 | Siehrs |
| 2,348,927 A | 5/1944 | Runsvold et al. |
| 2,690,856 A | 10/1954 | Trondle |
| 2,781,947 A | 2/1957 | Webster et al. |
| 2,929,532 A | 3/1960 | Tonelli |
| 3,045,864 A | 7/1962 | Hurst et al. |
| 3,069,654 A | 12/1962 | Hough |
| 3,166,177 A | 1/1965 | Laverty |
| 3,193,196 A | 7/1965 | Merrill et al. |
| 3,206,062 A | 9/1965 | Rappaport |
| 3,215,310 A | 11/1965 | Hurst et al. |
| 3,277,998 A | 10/1966 | Medoff |
| 3,368,713 A | 2/1968 | Hurst et al. |
| 3,369,648 A * | 2/1968 | Wentz ................. 198/794 |
| 3,400,857 A | 9/1968 | Schubert |

(Continued)

FOREIGN PATENT DOCUMENTS

AU     99676775     5/1997

(Continued)

OTHER PUBLICATIONS

Knutsen, Bernhard P.; U.S. Appl. No. 10/869,595, filed Jun. 16, 2004; RFID Tag and Method of User Verification.

*Primary Examiner*—Gene Crawford
*Assistant Examiner*—Timothy R Waggoner
(74) *Attorney, Agent, or Firm*—Hovey Williams LLP

(57) ABSTRACT

A medicament storage and dispensing system (10) operable for storing and dispensing products (12) such as pre-packaged pharmaceutical boxes and/or bottles and broadly includes a cabinet (14); a plurality of product shelves (16) mounted within the cabinet; an infeed conveyor (18) for transporting products into the cabinet; an outfeed conveyor (20) for transporting products out of the cabinet; a transporter (22) moveable within the cabinet for transporting products between the shelves and the infeed and outfeed conveyors; and a control system (24) for controlling operation of the conveyors and the transporter in response to prescriptions received from a host computer (26). The shelves having a plurality of vertical walls (56) upon which the products rest and between which tines (130) of the transporter slide in order to retrieve products from and place products upon the shelves.

7 Claims, 11 Drawing Sheets

U.S. PATENT DOCUMENTS

| | | | |
|---|---|---|---|
| 3,603,327 A | 9/1971 | Buchholz et al. | |
| 3,677,437 A | 7/1972 | Haigler | |
| 3,692,211 A | 9/1972 | Flubacker | |
| 3,719,288 A | 3/1973 | Schmitt et al. | |
| 3,746,211 A | 7/1973 | Burgess, Jr. | |
| 3,782,590 A | 1/1974 | Apfel | |
| 3,823,844 A | 7/1974 | Linkemer et al. | |
| 3,837,139 A | 9/1974 | Roseberg | |
| 3,871,156 A | 3/1975 | Koenig et al. | |
| 3,885,702 A | 5/1975 | Joslin et al. | |
| 3,917,045 A | 11/1975 | Williams et al. | |
| 3,921,196 A | 11/1975 | Patterson | |
| 3,985,264 A | 10/1976 | Shaw et al. | |
| 3,997,063 A | 12/1976 | Adams et al. | |
| 4,013,192 A | 3/1977 | Pillon | |
| 4,018,358 A | 4/1977 | Johnson et al. | |
| 4,171,178 A * | 10/1979 | Birkenfeld et al. | 414/790 |
| 4,247,019 A | 1/1981 | Lerner | |
| 4,264,396 A | 4/1981 | Steward | |
| 4,284,301 A | 8/1981 | Geiger et al. | |
| 4,386,860 A | 6/1983 | Price et al. | |
| 4,468,277 A | 8/1984 | Kontz | |
| 4,476,381 A | 10/1984 | Rubin | |
| 4,546,901 A | 10/1985 | Buttarazzi | |
| 4,615,350 A | 10/1986 | Boudville | |
| 4,660,824 A | 4/1987 | Hermkens et al. | |
| 4,668,150 A * | 5/1987 | Blumberg | 414/273 |
| 4,714,515 A | 12/1987 | Hoffmann | |
| 4,753,473 A | 6/1988 | Arnett | |
| 4,787,803 A | 11/1988 | van Elten et al. | |
| 4,803,487 A | 2/1989 | Willard et al. | |
| 4,810,230 A | 3/1989 | Shirasawa | |
| 4,811,764 A | 3/1989 | McLaughlin | |
| 4,835,372 A | 5/1989 | Gombrich et al. | |
| 4,851,072 A | 7/1989 | Kontz | |
| 4,857,716 A | 8/1989 | Gombrich et al. | |
| 4,868,409 A | 9/1989 | Tanaka et al. | |
| 4,869,394 A | 9/1989 | Hurst | |
| 4,872,803 A | 10/1989 | Asakawa | |
| 4,902,263 A | 2/1990 | Ito et al. | |
| 4,918,604 A | 4/1990 | Baum | |
| 4,954,817 A | 9/1990 | Levine | |
| 4,957,199 A * | 9/1990 | Wokke et al. | 198/847 |
| 4,958,280 A | 9/1990 | Pauly et al. | |
| 5,007,085 A | 4/1991 | Greanias et al. | |
| 5,020,958 A * | 6/1991 | Tuttobene | 221/88 |
| 5,033,785 A | 7/1991 | Woolley, Jr. | |
| 5,082,268 A | 1/1992 | Santoro | |
| 5,101,963 A * | 4/1992 | Skarlupka et al. | 198/800 |
| 5,194,857 A | 3/1993 | Gomez | |
| 5,208,762 A | 5/1993 | Charhut et al. | |
| 5,323,677 A | 6/1994 | Knutson | |
| 5,332,275 A | 7/1994 | Conway et al. | |
| 5,335,664 A | 8/1994 | Nagashima | |
| 5,337,919 A | 8/1994 | Spaulding et al. | |
| 5,348,061 A | 9/1994 | Riley et al. | |
| 5,401,059 A | 3/1995 | Ferrario | |
| 5,401,160 A * | 3/1995 | Bellettato | 425/397 |
| 5,453,759 A | 9/1995 | Seebach | |
| 5,463,839 A | 11/1995 | Stange et al. | |
| 5,481,265 A | 1/1996 | Russell | |
| 5,493,805 A | 2/1996 | Penuela et al. | |
| 5,512,879 A | 4/1996 | Stokes | |
| 5,562,232 A | 10/1996 | Pearson | |
| 5,597,995 A | 1/1997 | Williams et al. | |
| 5,621,384 A | 4/1997 | Crimmins et al. | |
| 5,629,981 A | 5/1997 | Nerlikar | |
| 5,671,592 A | 9/1997 | Yuyama et al. | |
| 5,682,032 A | 10/1997 | Philipp | |
| 5,700,998 A | 12/1997 | Palti | |
| 5,706,026 A | 1/1998 | Kent et al. | |
| 5,713,485 A | 2/1998 | Liff et al. | |
| 5,713,487 A | 2/1998 | Coughlin | |
| 5,718,525 A | 2/1998 | Bruhnke et al. | |
| 5,762,235 A | 6/1998 | Coughlin | |
| 5,771,657 A | 6/1998 | Lasher et al. | |
| 5,781,511 A | 7/1998 | Yasukawa et al. | |
| 5,797,515 A | 8/1998 | Liff et al. | |
| 5,798,020 A | 8/1998 | Coughlin et al. | |
| 5,812,410 A | 9/1998 | Lion et al. | |
| 5,832,296 A | 11/1998 | Wang et al. | |
| 5,845,264 A | 12/1998 | Nellhaus | |
| 5,860,563 A | 1/1999 | Guerra et al. | |
| 5,873,488 A | 2/1999 | Guerra | |
| 5,883,370 A | 3/1999 | Walker et al. | |
| 5,884,806 A | 3/1999 | Boyer et al. | |
| 5,897,024 A | 4/1999 | Coughlin et al. | |
| 5,903,225 A | 5/1999 | Schmitt et al. | |
| 5,907,493 A | 5/1999 | Boyer et al. | |
| 5,959,530 A | 9/1999 | Lupien, Jr. et al. | |
| 5,963,453 A | 10/1999 | East | |
| 6,006,946 A | 12/1999 | Williams et al. | |
| D418,494 S | 1/2000 | Robb | |
| 6,036,017 A | 3/2000 | Bayliss, IV | |
| 6,036,812 A | 3/2000 | Williams et al. | |
| 6,039,251 A | 3/2000 | Holowko et al. | |
| 6,070,140 A | 5/2000 | Tran | |
| 6,075,189 A | 6/2000 | Robb | |
| 6,085,938 A | 7/2000 | Coughlin | |
| 6,119,737 A | 9/2000 | Yuyama et al. | |
| 6,155,485 A | 12/2000 | Coughlin et al. | |
| 6,161,721 A | 12/2000 | Kudera et al. | |
| 6,206,590 B1 | 3/2001 | Thomas et al. | |
| D440,570 S | 4/2001 | Schneider | |
| 6,225,988 B1 | 5/2001 | Robb | |
| 6,249,277 B1 | 6/2001 | Varveris | |
| 6,310,542 B1 | 10/2001 | Gehlot | |
| 6,318,630 B1 | 11/2001 | Coughlin et al. | |
| 6,320,570 B2 | 11/2001 | Robb | |
| 6,343,711 B1 | 2/2002 | Coughlin | |
| 6,346,886 B1 | 2/2002 | De La Huerga | |
| D458,933 S | 6/2002 | Schneider | |
| 6,421,584 B1 | 7/2002 | Norberg et al. | |
| 6,477,442 B1 | 11/2002 | Valerino, Sr. | |
| 6,478,185 B2 | 11/2002 | Kodama et al. | |
| 6,526,158 B1 | 2/2003 | Goldberg | |
| 6,533,480 B2 | 3/2003 | Schneider | |
| 6,564,104 B2 | 5/2003 | Nelson et al. | |
| 6,574,580 B2 | 6/2003 | Hamilton | |
| 6,575,596 B2 | 6/2003 | Butt | |
| 6,578,734 B1 | 6/2003 | Coughlin | |
| 6,587,090 B1 | 7/2003 | Jarra | |
| 6,592,005 B1 | 7/2003 | Coughlin et al. | |
| 6,600,418 B2 | 7/2003 | Francis et al. | |
| 6,624,739 B1 | 9/2003 | Stobbe | |
| 6,692,211 B2 | 2/2004 | Yuyama et al. | |
| 6,695,207 B1 | 2/2004 | Norris, Jr. | |
| 6,703,918 B1 | 3/2004 | Kita | |
| 6,724,690 B1 | 4/2004 | Endo et al. | |
| 6,774,796 B2 | 8/2004 | Smith | |
| 6,883,681 B1 | 4/2005 | Coughlin et al. | |
| 6,978,882 B2 * | 12/2005 | Nagler | 198/750.11 |
| 7,086,560 B2 * | 8/2006 | Shioya | 221/191 |
| 2003/0142588 A1 | 7/2003 | Kawatahara | |

FOREIGN PATENT DOCUMENTS

| | | |
|---|---|---|
| DE | 4235047 | 4/1994 |
| EP | 282785 A | 9/1988 |
| EP | 0471530 | 12/1991 |
| EP | 0827733 | 8/1997 |
| EP | 0924676 | 10/1998 |
| FR | 1449591 | 8/1966 |
| GP | 2109137 | 5/1983 |

| | | | | | | |
|---|---|---|---|---|---|---|
| JP | 53145260 | 12/1978 | | JP | 9202301 | 8/1997 |
| JP | 0043743 | 3/1984 | | JP | 9231342 | 9/1997 |
| JP | 3031965 | 2/1991 | | JP | 09259344 A | 10/1997 |
| JP | 3240602 | 10/1991 | | JP | 11296727 A | 10/1997 |
| JP | 4174061 | 6/1992 | | JP | 10059336 | 3/1998 |
| JP | 6127635 | 5/1993 | | SU | 918086 | 4/1982 |
| JP | 6315521 | 11/1994 | | WO | 9422580 | 10/1994 |
| JP | 7187165 | 7/1995 | | WO | 9529455 | 11/1995 |
| JP | 8007058 | 1/1996 | | WO | 9809598 | 3/1998 |
| JP | 8115376 | 5/1996 | | | | |
| JP | 9034964 | 2/1997 | | | | |

* cited by examiner

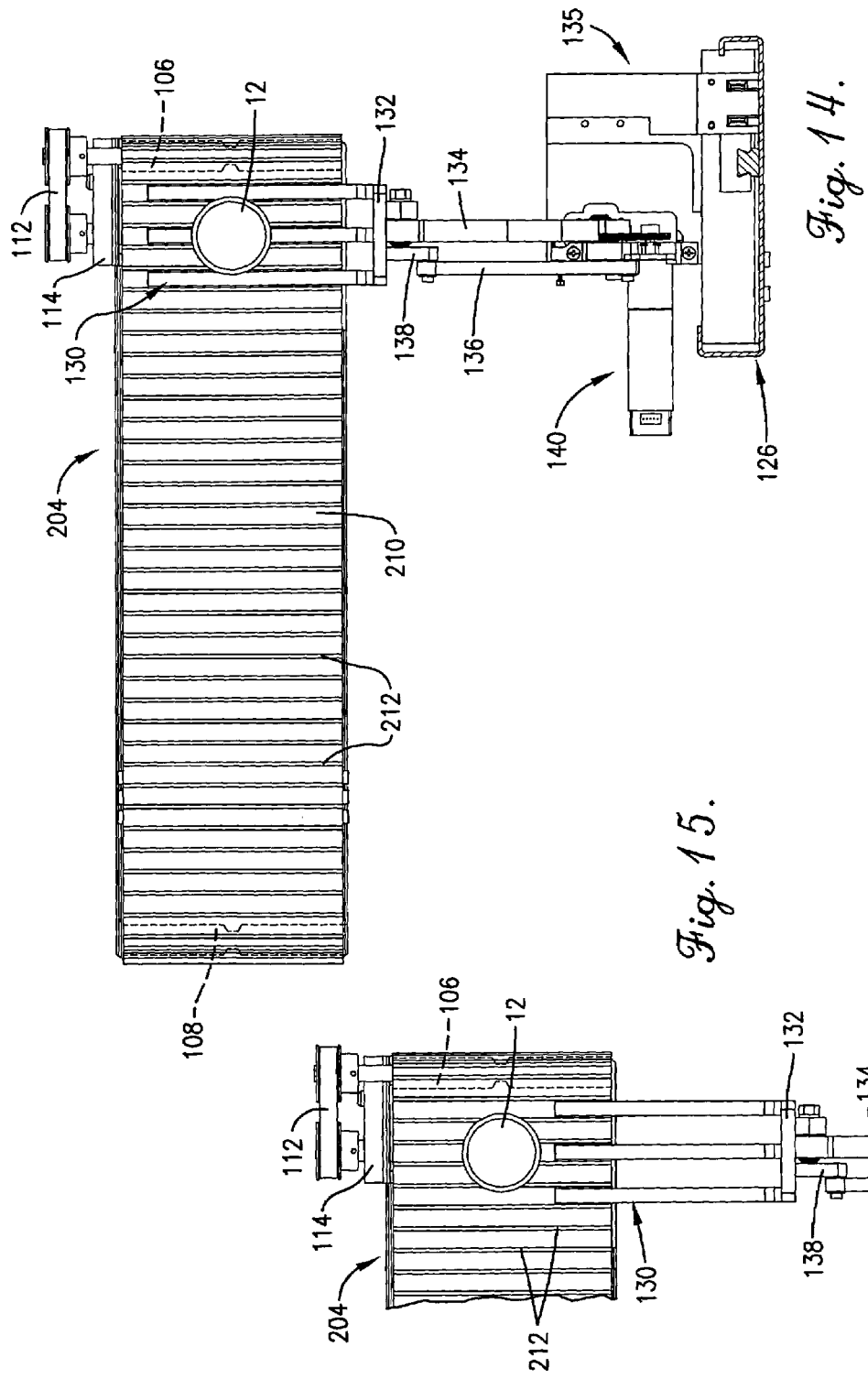

FORK BASED TRANSPORT STORAGE SYSTEM FOR PHARMACEUTICAL UNIT OF USE DISPENSER

RELATED APPLICATION

This application claims the priority benefit of co-pending U.S. patent application entitled "FORK BASED TRANSPORT STORAGE SYSTEM FOR PHARMACEUTICAL UNIT OF USE DISPENSER", Ser. No. 10/896,477, filed Jul. 22, 2004, incorporated into the present application by reference. This application is also related to U.S. patent application "AUTOMATIC DISPENSING SYSTEM FOR UNIT MEDICAMENT PACKAGES", Ser. No. 09/457,286, now U.S. Pat. No. 6,883,681, filed Dec. 8, 1999, incorporated into the present application by reference.

BACKGROUND OF THE INVENTION

1. Field of the Invention

The present invention relates to the field of medicament dispensing systems. More particularly, the invention relates to a system for automatically storing and dispensing pre-packaged pharmaceutical products and other products.

2. Description of the Prior Art

Pharmacists spend an increasing amount of time educating patients about proper use and handling of medicaments and pharmaceuticals. While this trend toward more patient counseling increases patients' knowledge about medicaments and decreases improper use of medicaments, it leaves less time for pharmacists to fill and dispense medicaments.

Automatic medicament dispensing systems, such as the one disclosed in U.S. Pat. No. 5,337,919 (hereinafter referred to as the "'919 patent"), have been developed to assist pharmacists in filling and dispensing prescriptions and to therefore have more time for patient counseling. The system described in the '919 patent is extremely effective for filling and dispensing medicaments in the form of pills and capsules, but is not designed to dispense larger pre-packaged pharmaceuticals. Pharmacists in many areas dispense large quantities of pre-packaged boxes and/or bottles of pharmaceuticals and currently must manually locate and dispense these items, reducing the amount of time those pharmacists have for patient counseling.

Another problem with manually locating and dispensing pre-packaged pharmaceuticals is that errors are sometimes made. For example, many boxes of pre-packaged pharmaceuticals look alike even though they have different strengths or quantities of medicaments therein. Pharmacists therefore occasionally locate and dispense the wrong box. Such errors can obviously have serious consequences for patients receiving such products.

Additionally, as some packages of pharmaceuticals may be of different sizes and/or shapes, mechanical devices often have difficulty gripping individual packages. Furthermore, in gripping a package, a mechanical device may disturb other packages, making future retrieval of those disturbed packages more difficult.

Accordingly, there is a need for an improved medicament dispensing system that overcomes the limitations of the prior art. More particularly, there is a need for a medicament dispensing system for automatically storing and dispensing a variety of pre-packaged pharmaceutical boxes and/or bottles and other products so that pharmacists will have more time for patient counseling and will not make errors while manually dispensing products.

OBJECTS AND SUMMARY OF THE INVENTION

The present invention solves the above-described problems and provides a distinct advance in the art of automatic medicament dispensing systems. More particularly, the present invention provides a medicament dispensing system configured for storing and dispensing a variety of pre-packaged pharmaceutical products such as inhalants, eye preparations, cream-based medications in tubes, birth control pills, syringes, patch-based medications, injectables, gauze, bottles of pills, liquids, powders, creams, or capsules, trays, supplies and other products. The system of the present invention may also be used to store and dispense pre-filled bottles or vials of medicaments filled by an automatic medicament dispensing system such as the SP 200 medicament dispensing system manufactured and sold by ScriptPro LLC of Mission, Kans.

The medicament dispensing system of the present invention broadly includes a cabinet; a plurality of product shelves mounted within the cabinet and each configured for holding at least one product; an infeed conveyor for receiving products that are to be stored in the cabinet; an outfeed conveyor for receiving products that are to be dispensed from the cabinet; a transporter moveable within the cabinet for transporting products between the shelves and the infeed and outfeed conveyors for storing products in or dispensing products from the cabinet; and a control system that controls operation of the conveyors and the transporter to dispense products from the cabinet in response to prescriptions received from a host computer.

The shelves include a plurality of spaced vertical walls upon which the products rest. The transporter preferably comprises at least two tines that may fit between selected ones of the vertical walls. The tines may be positioned between the vertical walls and below a product without disturbing any of the products. The transporter may then rise above the vertical walls, lifting the product off the shelf. Alternatively, the transporter may deposit the product on the shelf by first positioning the tines above and between the vertical walls. As the tines are lowered between the vertical walls, the product is deposited upon the shelf.

The control system includes a controller that maintains or accesses databases or tables which record the identification, location and status of all products and conveyors within the cabinet. When the controller receives a prescription to be filled from the host computer, it accesses the databases to locate a product or products to fill the prescription and then directs the conveyors and transporter to find and dispense the products. The control system may also include a bar code scanner, a label printer, a keypad, and a operator interface screen for permitting an operator to scan bar code labels on the products as they are being loaded into the cabinet and after they are dispensed from the cabinet and for printing prescription labels for the products.

The medicament dispensing system of the present invention significantly reduces the amount of time that a pharmacist or other operator spends on filling and dispensing prescriptions for pre-packaged pharmaceuticals and therefore allows the pharmacist to spend more time counseling patients. Moreover, the system eliminates errors associated with manual filling and dispensing of pre-packaged pharmaceuticals.

These and other important aspects of the present invention are described more fully in the detailed description below.

BRIEF DESCRIPTION OF THE DRAWING FIGURES

A preferred embodiment of the present invention is described in detail below with reference to the attached drawing figures, wherein:

FIG. 14 is a plan view of an outfeed conveyor of the system of FIG. 12, showing a product transferred from the transporter to the outfeed conveyor; and FIG. 15 is a fragmentary plan view of the outfeed conveyor of FIG. 14 showing the product transferred to the outfeed conveyor.

DETAILED DESCRIPTION OF THE PREFERRED EMBODIMENTS

Figure 1:
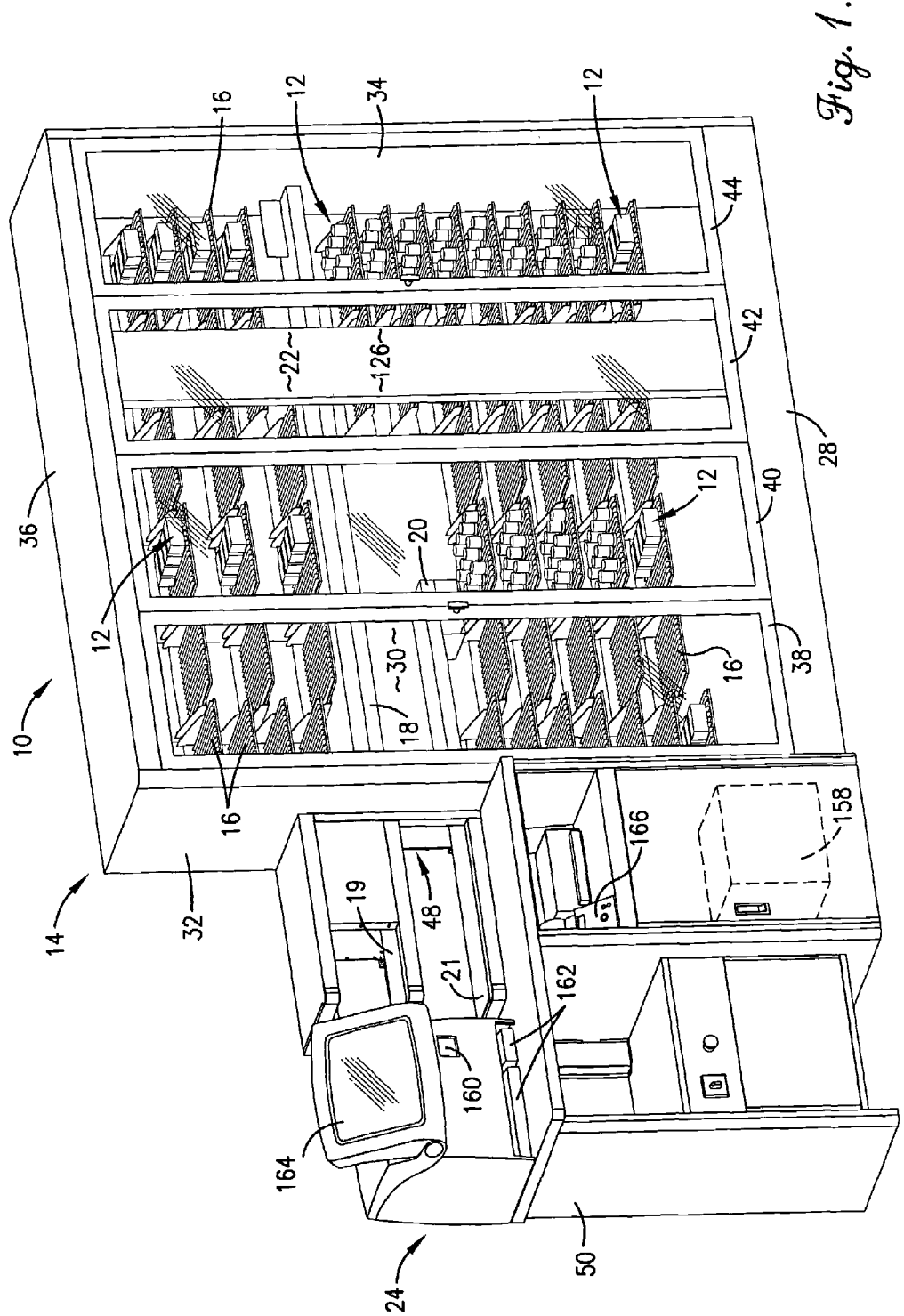
FIG. 1 is a perspective view of a medicament dispensing system constructed in accordance with a preferred embodiment of the present invention.
Figure 9:
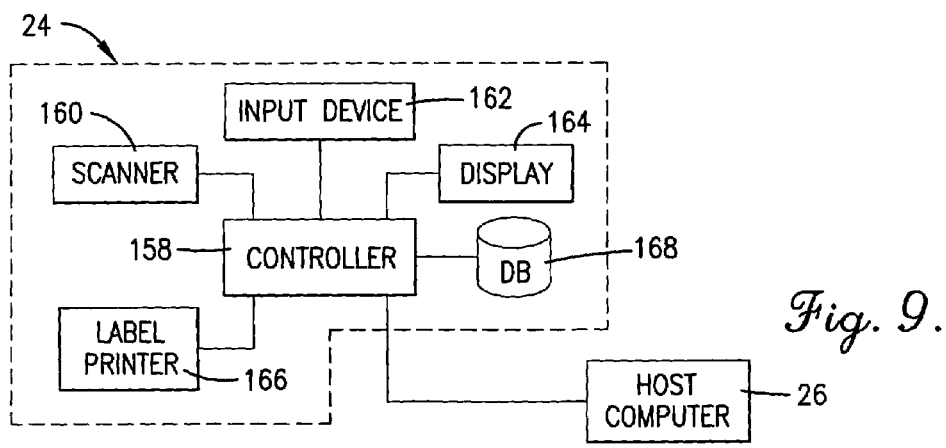
FIG. 9 is a schematic diagram of the components of a control system.

Turning now to the drawing figures, and particularly FIG. 1, a medicament storage and dispensing system 10 constructed in accordance with a preferred embodiment of the invention is illustrated. The system 10 is operable for storing and dispensing products 12 such as pre-packaged pharmaceutical boxes and/or bottles and broadly includes a cabinet 14; a plurality of product shelves 16 mounted within the cabinet 14 and each configured for holding at least one of the products 12 thereon; an infeed conveyor 18 for transporting the products 12 into the cabinet 14; an outfeed conveyor 20 for transporting the products 12 out of the cabinet 14; a transporter 22 (FIG. 3) moveable within the cabinet 14 for transporting the products 12 between the shelves 16 and the infeed and outfeed conveyors 18,20; and a control system 24 for controlling operation of the conveyors 18,20 and the transporter 22 in response to prescriptions (scripts) received from a host computer 26 (FIG. 9). Some of the system's 10 components are disclosed in detail in co-pending U.S. patent application "AUTOMATIC DISPENSING SYSTEM FOR UNIT MEDICAMENT PACKAGES", referenced above and incorporated into the present application by reference.

Cabinet

Figure 2:
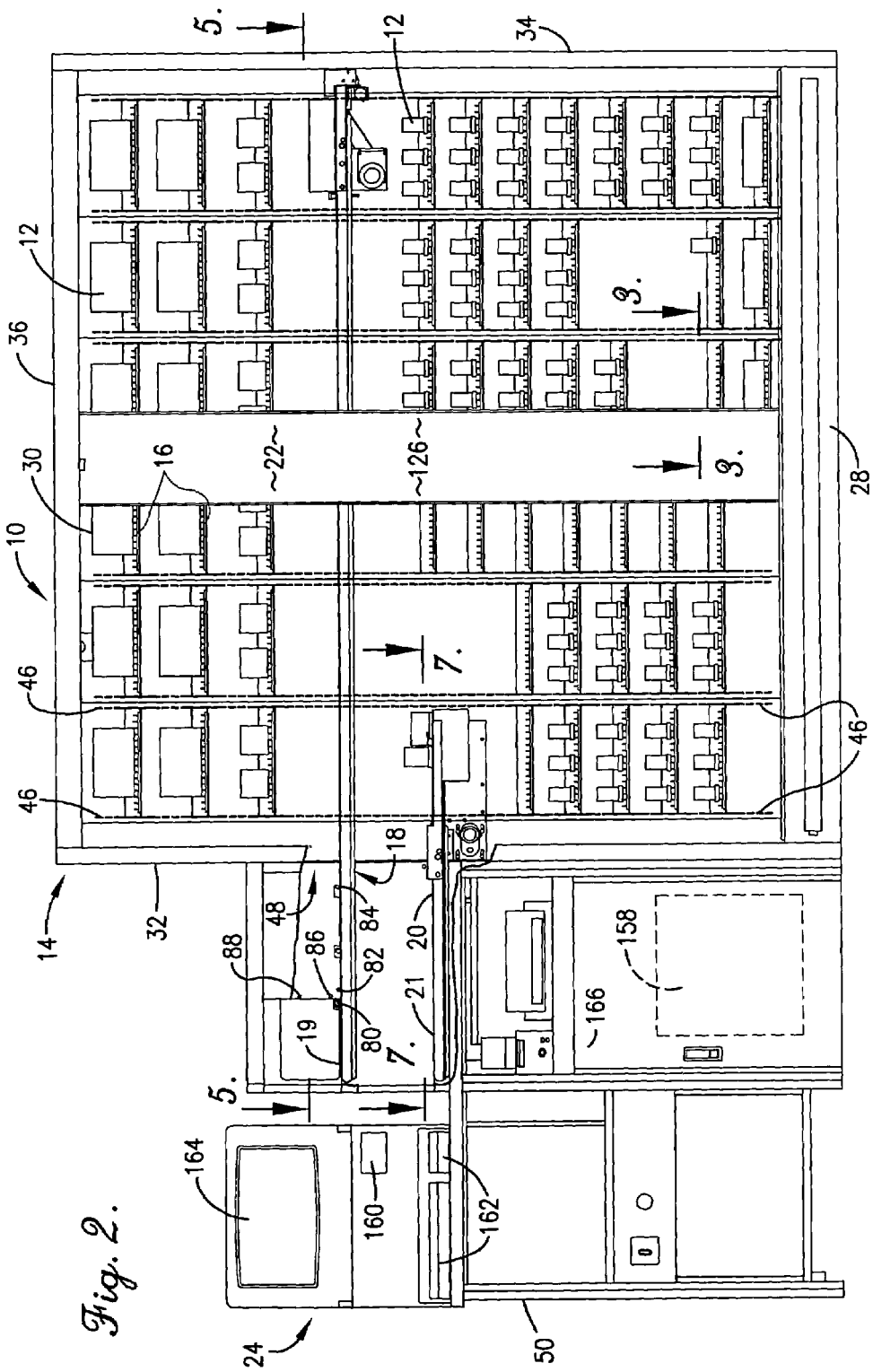
FIG. 2 is a front elevational view of the system with portions broken away.

Referring also to FIG. 2, the cabinet 14 encloses and supports the shelves 16, the conveyors 18,20 and the transporter 22. The cabinet 14 preferably includes a front wall 28, a rear wall 30, a left side wall 32, a right side wall 34, and a top wall 36. The cabinet 14 is preferably formed primarily of steel or aluminum but may be formed of other suitable materials as a matter of design choice. The cabinet 14 may be mounted on a pedestal or base support to elevate the cabinet 14 to a desired level or may be placed directly on a floor or slab.

The front wall 28 of the cabinet 14 preferably includes four transparent panels 38,40,42,44 formed of glass or clear plastic which permit viewing of the products 12 stored in the cabinet 14 and observation of the operation of the system 10. The leftmost 38 and rightmost 44 transparent panels may be hinged at the left side wall 32 and right side wall 34 of the cabinet 14, respectively, to permit easy access to the interior of the cabinet 14. The hinged panels 38,44 are preferably provided with locks to prevent unauthorized entry into the cabinet 14.

The rear wall 30 of the cabinet 14 includes a series of mounting slots 46 arranged in row and column configuration for use in mounting the shelves 16 in the cabinet 14 as described in more detail below. The rear wall 30 may also include mounting hardware for securing the cabinet 14 against a wall or to a support.

An opening 48 is formed in the left side wall 32 of the cabinet 14 to permit the infeed conveyor 18 and outfeed conveyor 20 to extend therethrough. A table and cabinetry 50 are preferably positioned adjacent the left side wall 32 near the opening 48 for supporting the control system 24 and for providing a work area for a pharmacist or other operator of the system 10.

Shelves

Figure 3:
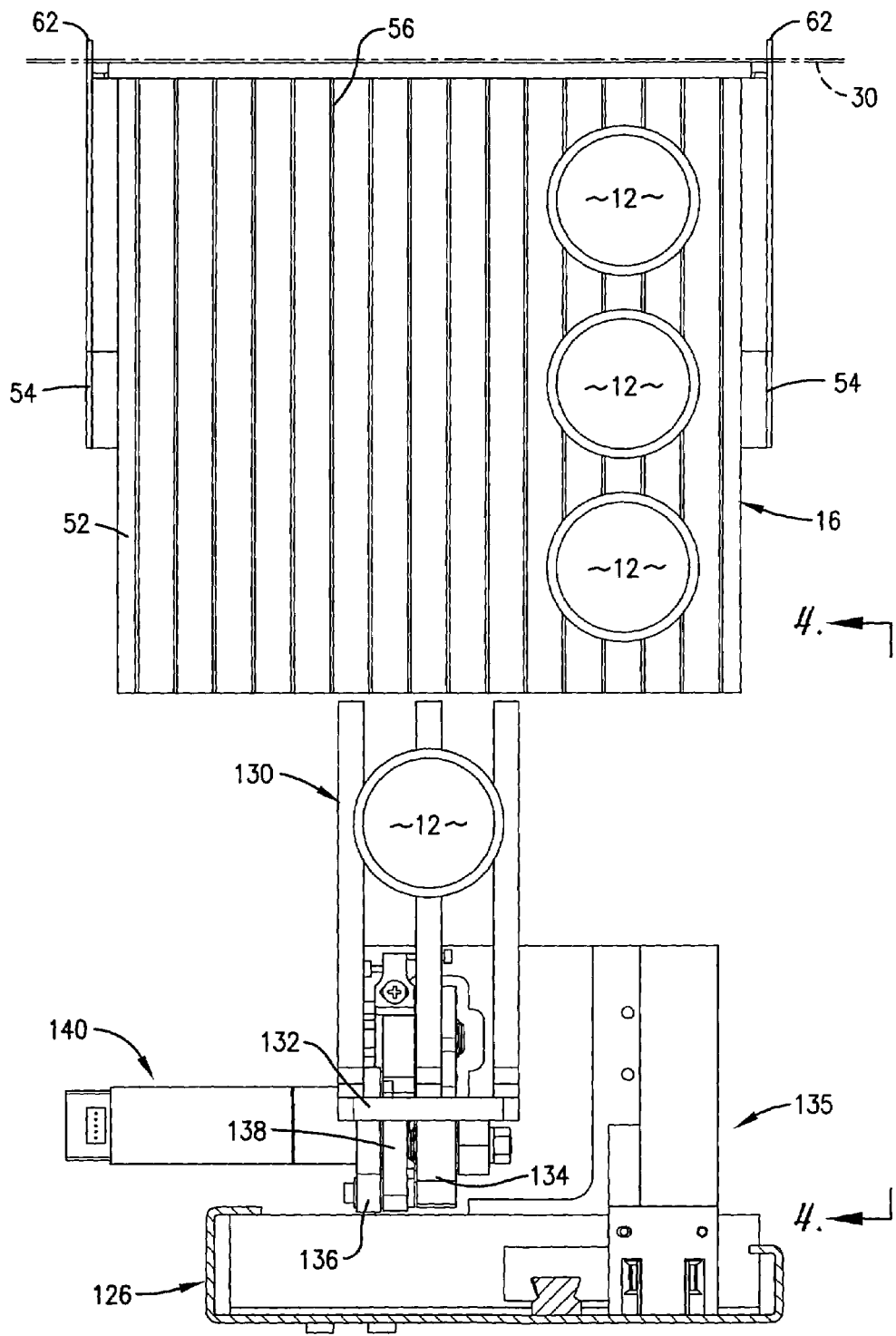
FIG. 3 is a fragmentary, sectional plan view of a transporter and a shelf of the system taken along line 3-3 of FIG. 2.
Figure 4:
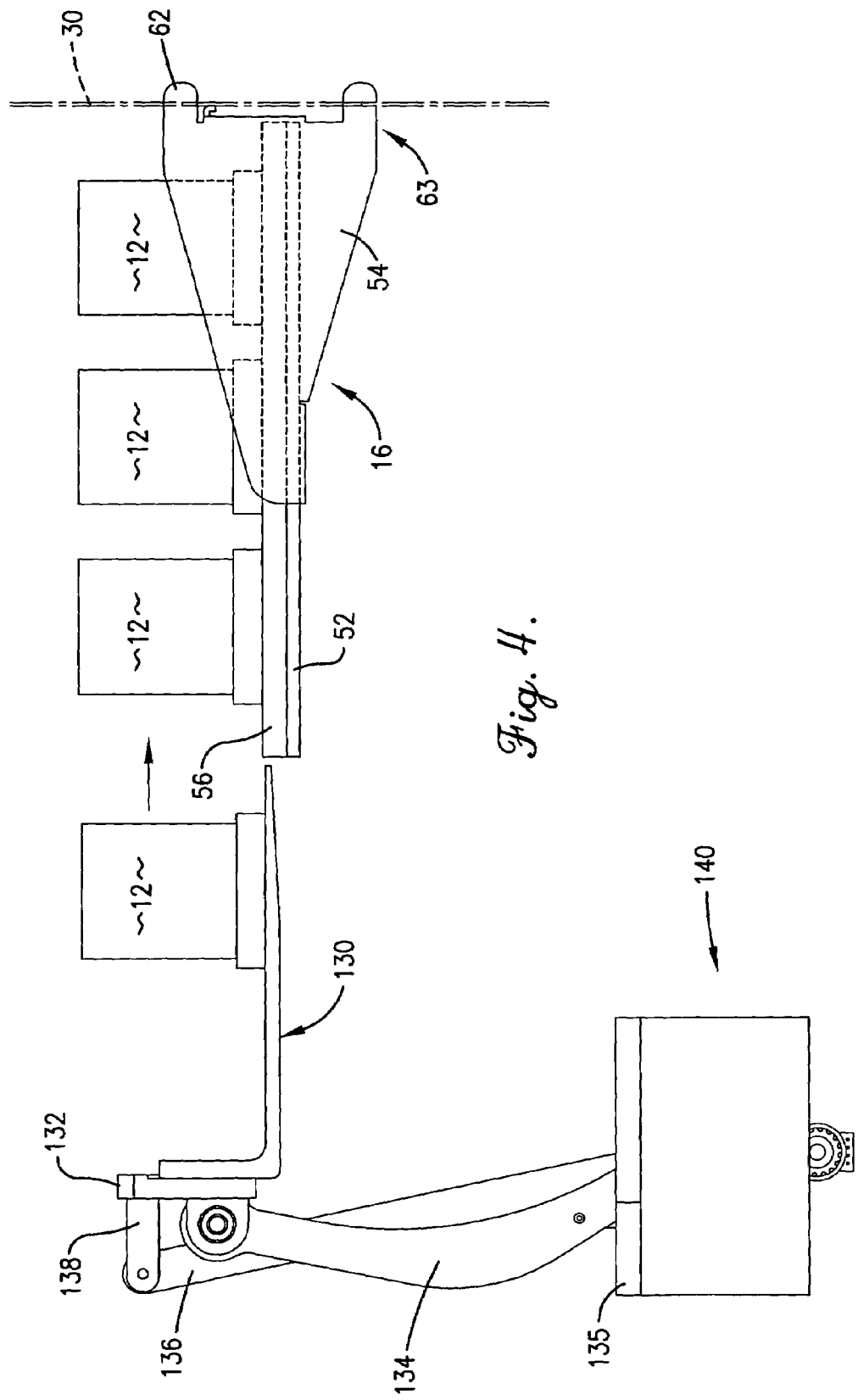
FIG. 4 is a side elevational view of the transporter taken along line 4-4 of FIG. 3 showing the transporter engaging with the shelf.

Referring also to FIGS. 3 and 4, the shelves 16 are provided for holding products 12 stored in the cabinet 14 and are configured to be mounted to the rear wall 30 of the cabinet 14 in a column and row configuration as depicted in FIGS. 1 and 2. Each shelf 16 can hold at least one, and normally several, products 12 aligned along the depth thereof. The shelves 16 can each be mounted to any of the slots 46 on the rear wall 30 of the cabinet 14 and can be periodically repositioned to different locations to accommodate different operating schemes. Typically, however, the shelves 16 will be pre-positioned during manufacture or installation of the system 10 and will not be repositioned frequently, if at all.

The shelves 16 can be arranged in the cabinet 14 to accommodate products 12 of varying sizes and shapes. For example, some of the shelves 16 may be mounted individually for narrow products such as pill bottles whereas some of the shelves 16 may be ganged or joined together for accommodating wider packages such as large boxes. Similarly, some of the shelves 16 may be mounted directly below other shelves 16 to accommodate relatively short packages whereas some of the shelves 16 may be spaced further below other shelves 16 to accommodate taller packages.

Normally one, and sometimes several, of the shelves 16 are designated for stock rotation only. These shelves 16 are used to temporarily store products that are positioned on the shelves 16 in front of other products that need to be dispensed or re-positioned. These shelves 16 are referred to as stock rotation shelves and are unavailable for long-term storage of products. At least one of the stock rotation shelves should be double width and have the maximum height clearance to temporarily store large packages.

Each shelf 16 comprises a horizontal plate 52 supported on either side by a bracket arm 54. The shelves 16 also include a plurality of spaced vertical walls 56 between the arms 54 and upon which the products 12 rest. The plates 52 may be virtually any width. However, since the shelves 16 are preferably fully enclosed within the cabinet 14, the plates 52 are preferably no wider than the rear wall 30 of the cabinet 14. In a preferred embodiment, the plates 52 are each slightly narrower than one quarter the width of the rear wall 30 of the cabinet 14, thereby allowing four columns of shelves 16.

Each column may have a different number of shelves 16. The shelves 16 may also be uniformly or non-uniformly vertically spaced within each column. For example, a first column may have ten uniformly vertically spaced shelves 16 and a second column may have twenty uniformly vertically spaced shelves 16. In this example, the first column would have approximately twice the vertical space between the shelves 16 as the second column. Thus, the first column may accept those products 12 having taller packaging, while the second column may only be used for those products 12 having shorter packaging.

Alternatively, any of the columns may have variable vertical spacing. For example, the shelves 16 may be closer together near a top of the column, thereby allowing those products 12 having taller packaging to be placed near a bottom of the column. Such configuration may be preferable where larger packaging implies heavier products. However, since smaller packaging allows higher quantities of packages to be placed on the shelves 16, the opposite may be true. In that case, the shelves 16 may be closer together near the bottom of the column, thereby allowing those products 12 having taller packaging to be placed near the top of the column. In any case, it is desirable to place greater weight, whether that be attined though larger or smaller packaging, near the bottom of the columns, thereby lowering the cabinet's 14 center of gravity and stabilizing the cabinet 14.

The arms 54 preferably extend approximately half way along the plate's 52 depth in order to rigidly support the plates 52. Each arm 54 preferably includes a tab 62 that fits within one of the slots 46 on the rear wall 30 of the cabinet 14 and a standoff 63 that prevents the arm 54 from rotating downwardly, thereby supporting the weight of the shelf 16 and the products 12 resting thereon. The standoffs 63 may also fit within the slots 46 or may simply rest against the rear wall 30 of the cabinet 14. The interaction between the slots 46, tabs 62, and standoffs 63 allow the shelves 16 to be rigidly secured within the cabinet 14 and be repositioned as needed.

The vertical walls 56 extend perpendicularly with respect to the rear wall 30 of the cabinet 14 and the plates 52. The vertical walls 56 are also preferably approximately one quarter inch tall and uniformly spaced approximately one quarter inch apart. The vertical walls 56 are preferably one sixteenth of an inch thick, but may be other thicknesses depending upon the required strength resulting from expected product weight. The plates 52 and vertical walls 56 are preferably extruded from aluminum as a unit and then secured to the arms 54.

Infeed Conveyor

The infeed conveyor 18 is provided for loading the products 12 into the cabinet 14 that will be subsequently stored on the shelves 16. As best illustrated in FIGS. 1 and 2, the infeed conveyor 18 extends transversely across the cabinet 14 between the left 32 and right 34 side walls of the cabinet 14 and includes an infeed section 19 that extends through the opening 48 of the left side wall 32.

Figure 5:
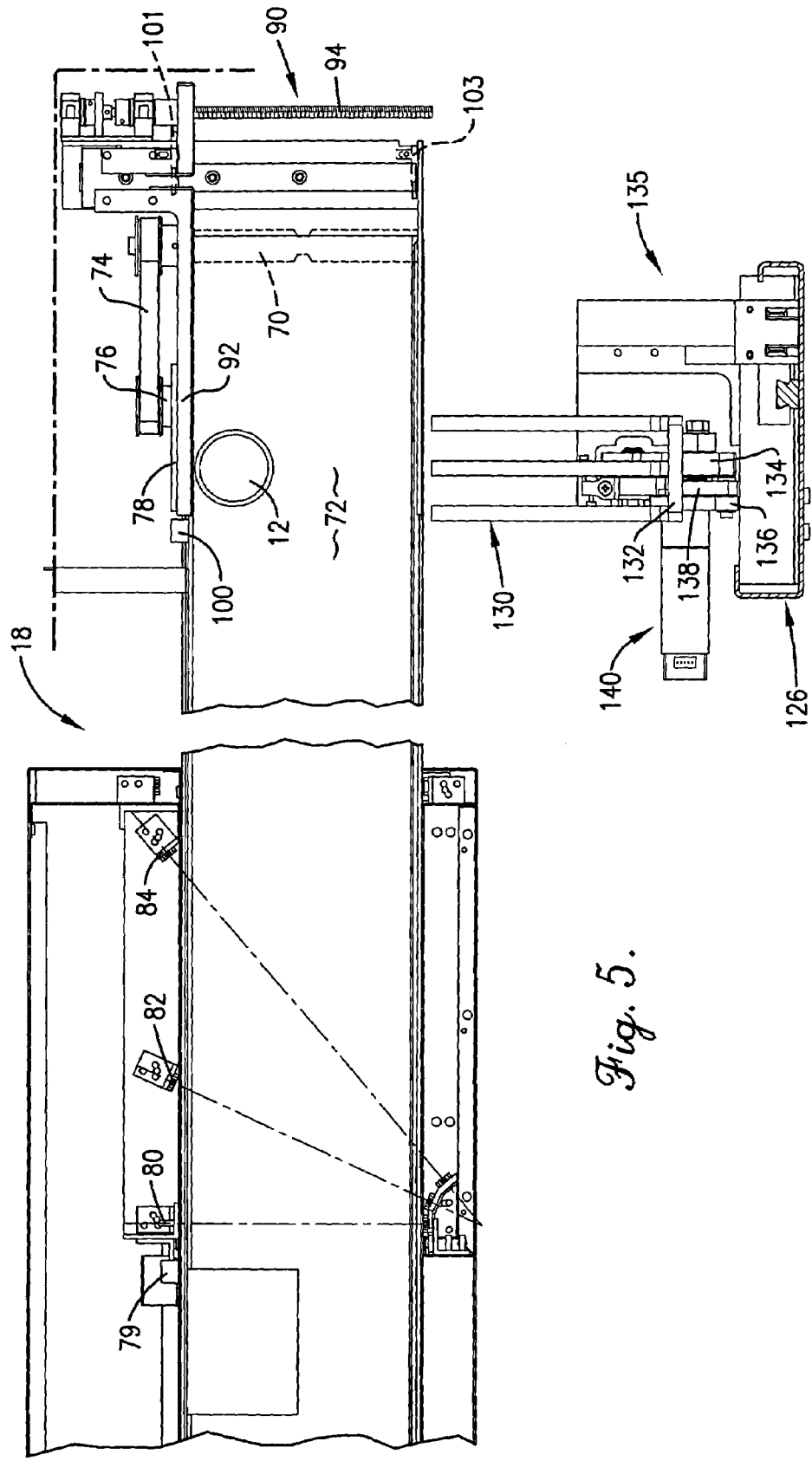
FIG. 5 is a fragmentary plan view of an infeed conveyor and the transporter showing the transporter in position to receive a product from an infeed conveyor.
Figure 6:
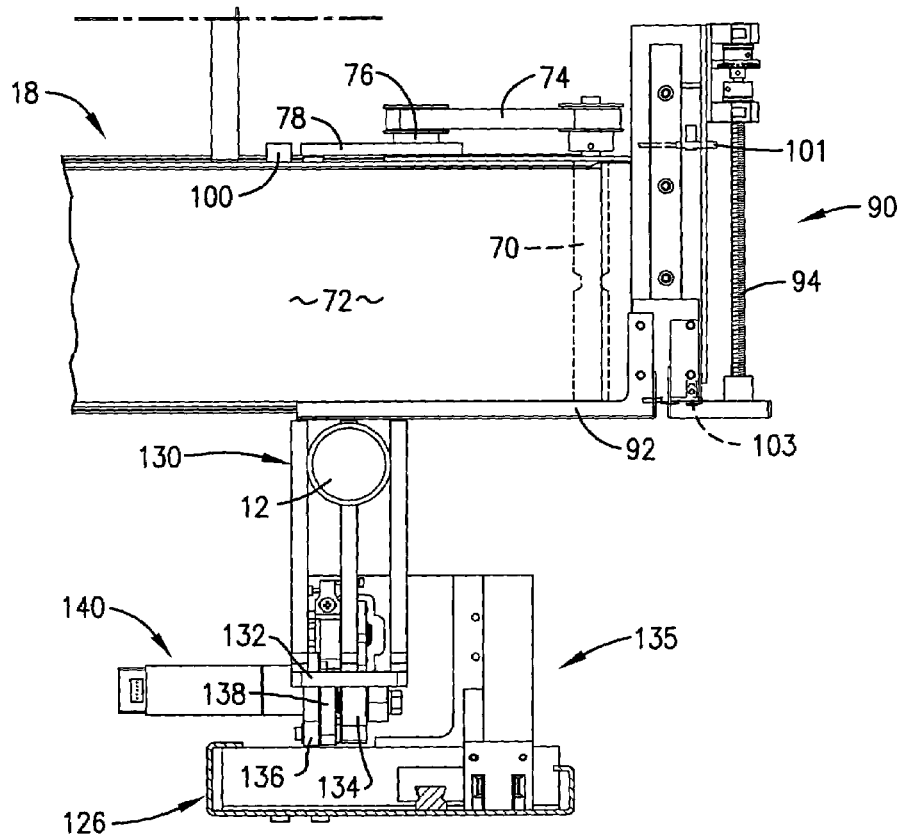
FIG. 6 is a fragmentary plan view of the infeed conveyor showing transfer of the product from the infeed conveyor onto the transporter.

Referring also to FIGS. 5 and 6, the infeed conveyor 18 includes a conveyor base (beneath belt 72), a plurality of rollers 70 (only one shown) rotatably mounted to the base, and a conveyor belt 72 trained across the rollers. The roller 70 nearest the right side wall 34 of the cabinet 14 serves as a drive roller that is driven by a conveyor belt 74 or chain rotated by a bi-directional conveyor motor 76. The conveyor motor 76 is controlled by the control system 24 and can move the conveyor belt 74 either forward or backward to move the products 12 either into or out of the cabinet 14. The conveyor motor 76 is mounted below the infeed conveyor belt 74 by a mounting plate 78. The conveyor motor 76 and/or rollers of the infeed conveyor 18 are preferably coupled with an encoder that monitors the position of the conveyor belt 74 to determine the exact position of the products 12 placed thereon.

A plurality of sensors 79,80,82,84 are mounted on the infeed conveyor 18 for sensing the presence, length, and depth of the products 12 placed thereon. Particularly, the sensor 79 senses the presence of each product 12 placed on the infeed conveyor 18 as it passes thereby, and the sensors 80,82,84 measure the length and depth of the product 12 in conjunction with the positional encoder coupled with the conveyor motor 76. The length and depth of the product 12 is used by the control system 24 to determine on which of the shelves 16 the product 12 should be placed. The sensors 79,80,82,84 are preferably conventional optical-type sensors each including an optical emitter and an optical detector.

Two additional sensors 86,88 best illustrated in FIG. 2 are mounted vertically above the infeed section 19 of the infeed conveyor 18 for sensing the height of the products 12 loaded thereon. Particularly, the sensor 86 is mounted approximately one inch above the infeed conveyor 18, and the sensor 88 is mounted approximately four inches above the infeed conveyor 18. Based on input from the sensors 86,88, the control system 24 calculates whether each product 12 is less than one inch tall, between one inch and four inches tall, or greater than four inches tall. Additional height sensors may be used to more accurately determine the height of each product 12 placed on the infeed conveyor 18. The height of each product 12 is used by the control system 24 to determine which of the shelves 16 has a smallest acceptable height clearance, as described in more detail below. The sensors 86,88 are preferably conventional optical-type sensors each including an optical emitter and an optical detector.

Dimensional information of each product 12 may be stored in the control system 24. However, one or more of the sensors may still be required to determine a package's orientation. For example, the system 10 may still be required to determine if a package with known dimensions is resting on the infeed conveyor 18 on a side of the package or a bottom of the package. This determination is helpful in deciding upon which shelf 16 the product 12 should be placed and may also be used to whether or not to reorient the product 12. For example, the system 10 may not have an available shelf 16 with sufficient vertical clearance for a relatively tall product. In this case, the system 10 may lay that tall product on it side, and may then be able to place that product on one of the shelves 16 having less vertical clearance.

A moveable ram assembly 90 is mounted adjacent the right end of the infeed conveyor 18. The ram assembly 90 includes a vertically extending ram plate 92 operable to move transversely across the end of the infeed conveyor 18 for pushing the products 12 from the infeed conveyor 18 to the transporter 22. The ram plate 92 is attached to and driven by a worm or screw gear 94 rotated by a corresponding motor and belt or chain.

A sensor 100 is preferably positioned adjacent a left side of the ram plate 92 for sensing when one of the products 12 has been conveyed in front of the ram plate 92. A sensor 101 is coupled with the ram assembly 90 for sensing when the ram plate 92 is in its retracted, home position illustrated in FIG. 5. Similarly, a sensor 103 is coupled with the ram assembly 90 for sensing when the ram plate 92 is in its extended position illustrated in FIG. 6.

Outfeed Conveyor

Figure 7:
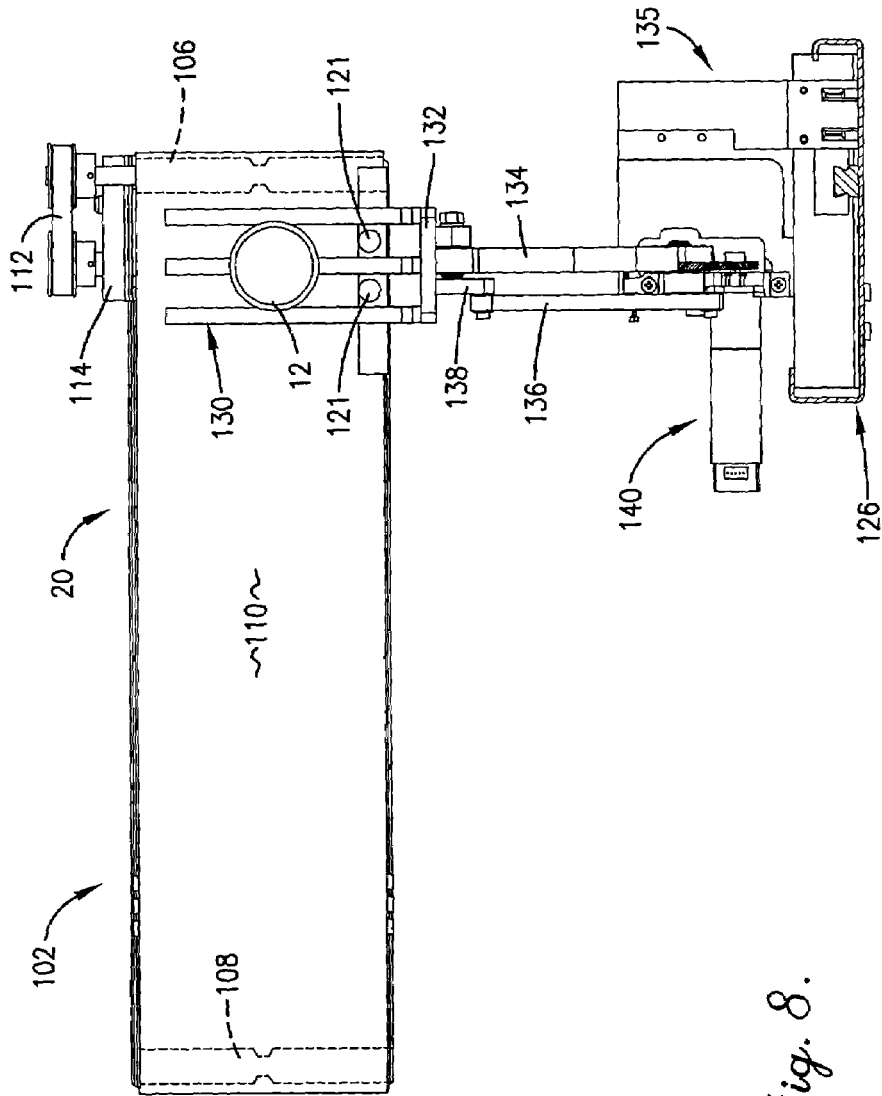
FIG. 7 is a plan view of an outfeed conveyor taken along line 7-7 of FIG. 2 showing a product transferred from the transporter to the platform section of an outfeed conveyor.
Figure 8:
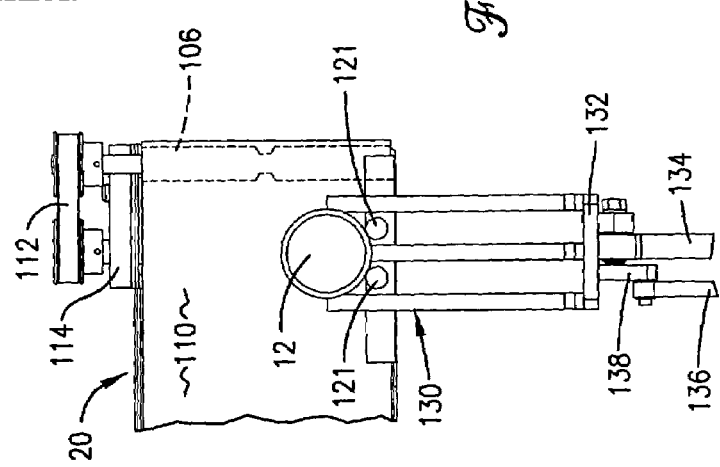
FIG. 8 is a fragmentary plan view of the outfeed conveyor showing the product transferred to the outfeed conveyor.
Figure 10:
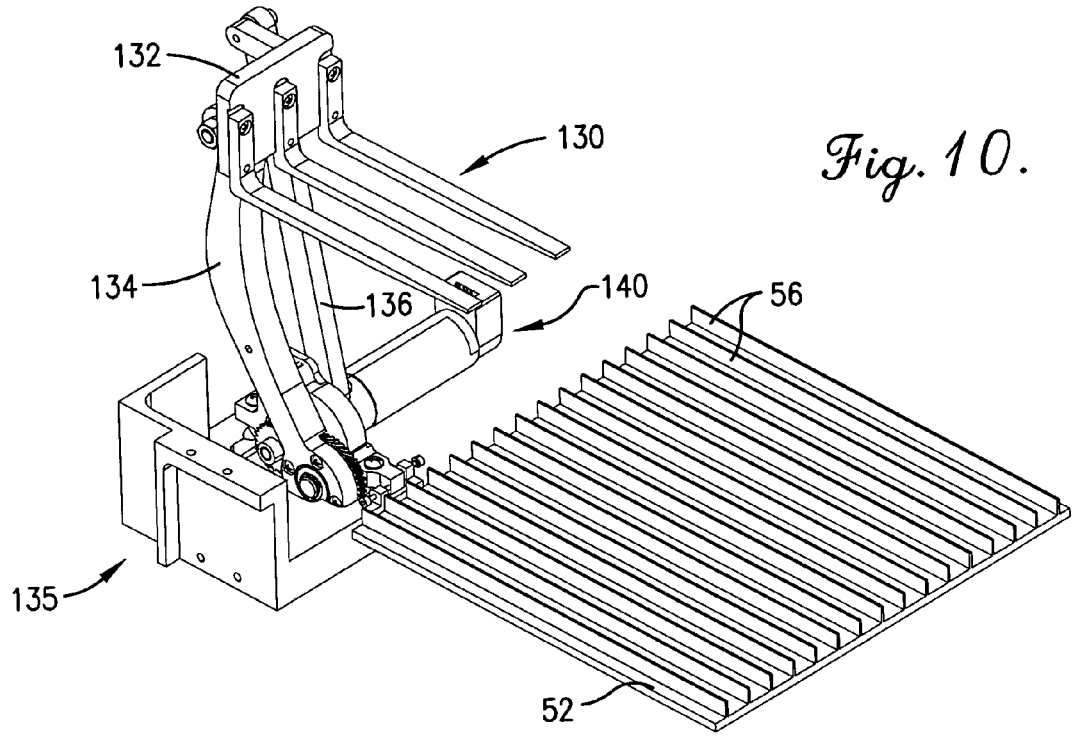
FIG. 10 is a perspective view of the transporter and the shelf.
Figure 11:
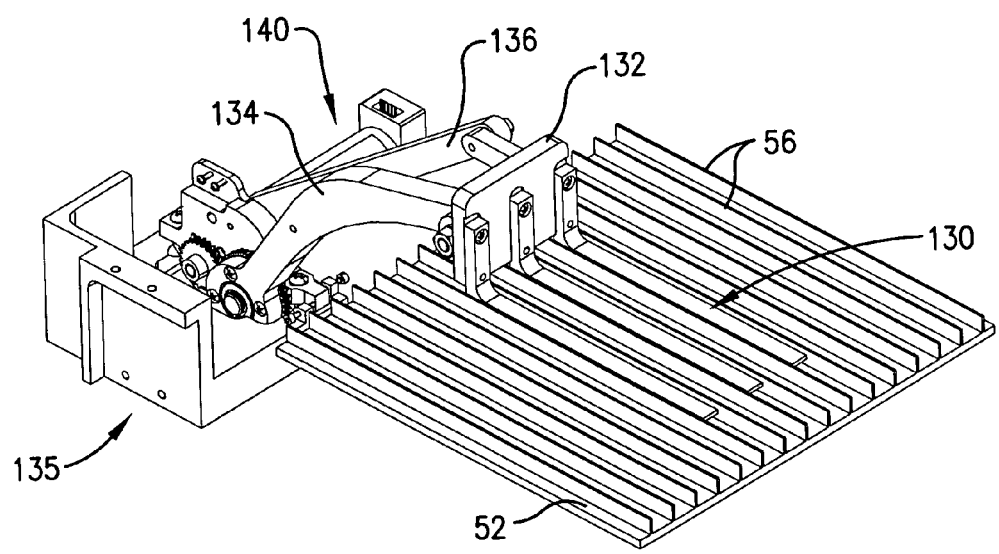
FIG. 11 is another perspective view of the transporter and the shelf.

Referring also to FIGS. 7 and 8, the outfeed conveyor 20 is provided for receiving products 12 from the transporter 22 and transporting the products 12 out of the cabinet 14 in response to prescriptions received by the control system 24. As best illustrated in FIGS. 1 and 2, the outfeed conveyor 20 extends transversely across the left side of the cabinet 14 and includes an outfeed section 21 that extends through the opening 48 of the left side wall 32 of the cabinet 14. The outfeed conveyor 20 is preferably positioned below the infeed conveyor 18 but may also be positioned above the infeed conveyor 18 as a matter of design choice.

The outfeed conveyor 20 includes a convey base (below belt 110), a pair of rollers 106,108 rotatably mounted to the ends of the base, and a conveyor belt 110 trained across the rollers. The rightmost roller 106 serves as a drive roller that is driven by a belt or chain 112 rotated by a conveyor motor 114. The conveyor motor 114 is preferably mounted below the conveyor belt 110 by a mounting plate. The conveyor motor 114 and/or rollers 106,108 of the outfeed conveyor 20 are preferably coupled with an encoder that, along with the control system 24, verifies the length of each product 12 placed on the outfeed conveyor 20 to ensure that the proper product has been dispensed.

The outfeed conveyor 20 preferably includes two or more vertical pegs 121 positioned adjacent an outboard edge of the belt 110. The pegs 121 are preferably approximately three sixteens of an inch in diameter and preferably extend approximately one inch above the belt 100. As will be discussed in greater detail below, the pegs 121 assist in removing the products 12 from the transporter 22.

Transporter

The transporter 22 is provided for transporting products 12 from the infeed conveyor 18 to the shelves 16 for storing the products 12 in the cabinet 14 and for transporting the products 12 from the shelves 16 to the outfeed conveyor 20 for dispensing the products 12 from the cabinet 14. The transporter 22 is attached to an X-Y axis drive assembly 126 that moves the transporter 22 under control of the control system 24 both vertically and horizontally within the cabinet 14 so that the transporter 22 can access the infeed and outfeed conveyors 18,20 and the shelves 16 for storing the products 12 in and dispensing products from the cabinet 14. The drive assembly 126 is preferably identical to the drive assembly provided with the SP 200 Medicament Dispensing System manufactured and sold by ScriptPro LLC of Mission, Kans., as described in detail in U.S. Pat. No. 5,337,919, hereby incorporated by reference. The teachings of U.S. Pat. Nos. 5,713, 487 and 5,762,235 are also incorporated into the present application by reference.

As illustrated in FIGS. 3-8, the transporter 22 includes three or more tines 130 that may fit between selected ones of the vertical walls 56 below a selected product. The tines 130 are preferably approximately $3/16$ inch wide and approximately $1/8$ inch thick. The tines 130 are preferably uniformly spaced and may be spaced on approximately $1/4$ inch centers or $1/2$ inch centers. In any case, the tines 130 are sized and spaced to fit between the vertical walls 56.

The tines 130 preferably extend substantially perpendicularly and rearwardly from a backplate 132 and thereby resemble a small forklift. The backplate 132 is rotatably secured to a control arm 134 and held substantially vertical by a brace 136 rotatably secured to a bracket 138 extending substantially perpendicularly and forwardly therefrom. Together, the control arm 134, brace 136, and bracket 138 maintain the backplate 132 substantially vertical and the tines 130 substantially horizontal.

The control arm 134 rotatably driven by a motor 140 rigidly secured to a mounting plate or structure 135 positioned by the drive assembly 126. Likewise, the brace 136 is rotatable secured to the mounting plate 135. With the control arm 134 rotated forwardly, the tines 130 clear the shelves 16 as the transporter 22 moves within the cabinet 14. The control arm 134 may also be rotated rearwardly in order to pick up or place the products 12 within the cabinet 14. More specifically, as the control arm 14 is rotated rearwardly, the transporter 22 is preferably raised, thereby keeping the tines 130 at a constant height while moving toward the rear wall 30 of the cabinet 14. Conversely, as the control arm 14 is rotated forwardly, the transporter 22 is preferably lowered, thereby keeping the tines 130 at the constant height while moving away from the rear wall 30 of the cabinet 14.

In this manner, the tines 130 may be slid horizontally between the vertical walls 56, below the products 12, and above the plate 52 of a particular one of the shelves 16 without disturbing any of the products 12. The system 10 may then raise the tines 130 above the vertical walls 56, by simply raising the mounting plate 135 using the drive assembly 126, thereby lifting a selected one of the products 12 off the shelf 16. Alternatively, the transporter 22 may deposit the product 12 on the shelf 16 by first positioning the tines 130 above and between the vertical walls 56. As the tines 130 are lowered between the vertical walls 56, by simply lowering the mounting plate 135 using the drive assembly 126, the product 12 is deposited upon the shelf 16. Then, the tines 130 are horizontally withdrawn from the shelf 16 between the product 12 and the plate 52.

Control System

Referring also to FIG. 9, the control system 24 receives prescriptions from the host computer 26 and controls operation of the conveyors 18,20 and the transporter 22 in response thereto. The host computer 26 may be any pharmacy computer running a pharmacy automation program such as the one provided by Zadall Computer Systems. The control system 24 broadly includes a controller 158 or computer, a bar code scanner 160 or other indicia reader, an input device 162 such as a keyboard, keypad, fingerprint reader, etc., a display 164 that serves as a operator interface, and a label printer 166.

The controller 158 communicates with and controls operation of the other components of the control system 124. The controller 158 maintains or accesses several databases 168 or tables which record: the identification and location of all products 12 within the cabinet 14; the type of products that may be stored in and dispensed from the cabinet; and the location and status of each of the shelves 16 mounted in the cabinet. For example, the controller 158 maintains a Conveyor Product Table containing information regarding each product 12 that is stored within the cabinet 14. The following is an example of such a Conveyor Product Table:

| Conveyor Product Table | |
|---|---|
| Product ID (Generated by controller) | 001 |
| Shelf ID | 50 |
| Conveyor Location (Infeed, Outfeed, Shelf) | Infeed |
| Z Ordinal (Location of the product from the end) | 5 |
| Drug Package ID (From Drug Package Table) | 0054472831 |
| UOW (unit of work) ID | 19287 |
| Cx_measured (Measurement in X Dimension) | 100 mm |
| Cy_measured (Measurement in Y Dimension) | 50 mm |
| Cz_measured (Measurement in Z Dimension) | 75 mm |
| Lot # | 002 |
| Expiration Date | 02/02/2000 |
| Date Loaded | 08/09/1999 |

Each product 12 on every shelf 16 will have a Conveyor Product Table entry. If the product 12 is a package, it will have a Drug Package ID. If the product 12 is a vial or prepack from a ScriptPro SP 200 medicament dispensing system, it will have a UOW (unit of work) ID (the SP 200 creates the UOW ID).

The Conveyor Product Table includes two date fields: Expiration date and Date loaded. This permits an operator to exclude an expiration date for a loaded product, in which case the product will never expire in the system. However, the operator can still see how long the product has been in the system by the Date loaded field.

The three fields, Cx, Cy, and Cz, are measured by the sensors 80, 82, 84, 86, 88 when a product is brought into the system 10 on the infeed conveyor 18. These help determine on which shelf 16 to store the product 12.

The Lot # field is optional for the operator to fill in. If the operator chooses to leave it blank and chooses the custom option to mix lots, the system 10 will dispense multiple boxes with null lot numbers for a script. If the operator chooses the custom option not to mix lots, the system 10 will only dispense one box with null lot number for one script.

The Z_ordinal determines the position or depth of each product 12 on one fo the shelves 16, the infeed conveyor 18, or the transporter 22. If the product 12 is on the infeed conveyor 18, Z_ordinal increments from right to left. If the product 12 is on a shelf 16, Z_ordinal increments from back to front. If the product 12 is on the transporter 22, Z_ordinal is typically used to merely indicate the presence of the product 12 thereon. Shelf ID is the ID of the shelf 16 that this product 12 is on or is scheduled to go on. When products 12 are on the infeed conveyor 18, the Shelf ID is the shelf 16 the product 12 is scheduled to go on. Each product 12 in the system 10 has a unique combination of Shelf ID, Z_ordinal and Conveyor Location. This ensures that multiple products are not planned to occupy the same space in the system 10.

The controller 158 also maintains a Drug Package Table containing one entry for each type of product 12 that may be stored in or dispensed from the cabinet 14. An operator may add new entries to the table as new products are introduced into the cabinet 14, or the table may be populated with entries of all known products during manufacture or installation. An exemplary Drug Package Table is as follows:

| Drug Package Table | |
|---|---|
| Product ID | 0054472831 |
| Size | 100 × 50 × 75 |
| Preferred Orientation | None |
| Default Expiration Date | 1/01/2001 |
| Type | Box |

The Product ID and Size fields contain the same information as the similar fields in the Conveyor Product Table. The Preferred Orientation field is used to identify a preferred orientation of a product on the infeed conveyor 18 so that the product 12 is placed on one of the shelves 16 in a particular orientation. The Default Expiration Date field is used to indicate a default expiration date that may be used if no actual expiration date is entered for a product. The Type field indicates whether the product is a rectangular box, oval bottle, round vial, or other shape.

The controller 158 also preferably maintains a Shelf Table containing one entry for each shelf 16 within the cabinet 14. An exemplary Machine Conveyor Table is as follows:

| Shelf Table | |
|---|---|
| Shelf ID (Generated by controller) | 3 |
| Col_number | B |
| Row-number | 2 |
| Shelf_width | 88 mm |
| Shelf_height (Height above the shelf) | 100 mm |
| Shelf_type (New or old for factory revs) | 0 |
| Attribute (for storage, used for rotation, needs reorganization) | 0 |

The Shelf ID field indicates an ID for a particular shelf 16. The Shelf IDs are typically generated by the controller 158 of the control system 24. The Col_number and Row-number fields indicate the position of a shelf 16 within the cabinet 14. The Shelf_width field indicates the width of a shelf 16, i.e. whether it is a single or double wide shelf 16. The Shelf_height field indicates the amount of free space above each shelf 16. The values in the Shelf Table are typically calculated and put in the Shelf Table during installation.

The operator can elect not to mix different kinds of products 12 on a shelf 16. If the operator chooses this option, the system 10 only stores one type of product on each shelf 16. If the operator does not choose this option, then each shelf 16 can contain several different products with different drugs and different packages, but each product 12 cannot be more than D% (D resides in custom options) different in dimension than the adjacent product (in the X dimension only). Each product Z_ordinal (in Shelf Table) will be in descending order from front to back of the shelf 16. When a product 12 is added to a shelf 16, 1 is added to the Z_ordinal of the existing front product to get the Z_ordinal of the new product. When a product 12 is removed, the Z_ordinal does not change for the remaining products on the shelf 16.

Operation

An operator may use the control system 24 to select any of the following operating modes for operating the system 10: load only, store only, dispense only, dispense and store, dispense and load, and maintenance. The operator can change between operating modes at any time by selecting a new control scheme with the display 164 and input device 162 of the control system 24. When an operator switches operating modes, the system 10 first finishes necessary actions associated with the current mode before proceeding to the next mode.

In the load only mode, the system 10 receives products 12 to be stored in the cabinet 14 and keeps them on the infeed conveyor 18. In the store only mode, the system takes products off the infeed conveyor and puts them on the shelves 16.

In the dispense only mode, the system 10 takes products off the shelves 16 and puts them on the outfeed conveyor 20 in response to scripts received from the host computer 26. In the dispense and store mode, dispensing of products takes precedence over storing of products. If the system 10 has scripts to dispense, it completes dispensing the products 12 in response to all of the scripts that it can fill and then performs storing of the products 12. If a script comes in during storing, storing is postponed, and the script is filled.

In the dispense and load mode, the system 10 dispenses and loads simultaneously because loading does not require use of the transporter 22. In the maintenance mode, the operator can selectively eject products from the cabinet 14. The loading, storing, dispensing, and maintenance functions are discussed in more detail below.

Loading

Products 12 that are to be loaded in the cabinet 14 must be individually identified by a national drug code (NDC), drug identification number (DIN), UOW (unit of work) ID (for SP 200 pre-packs), or other identification numbers. The identification numbers are preferably bar coded on the products but may also be merely printed thereon.

To load a product 12 into the cabinet 14, an operator first scans the bar code with the bar code scanner 160 or manually enters the identification number via the keyboard or other input device 162. The lot number and expiration date of a product are copied into the Conveyor Product Table when a product is first scanned. If the lot number is not entered, then "null" is entered into the table. If an expiration date is not entered, then a "null" or default value is entered. Once the identification number of a product has been scanned or input, the controller blocks the entry of subsequent identification numbers pending completion of a loading operation.

The operator next places the product 12 on the infeed conveyor 18 and directs the controller 158 to load the product 12 by selecting an icon on the display 164 or by entering information into the controller via the keyboard 162. The control system 24 may also require the operator to place his or her finger on a fingerprint reader or enter a PIN number to ensure that the operator is authorized to load products in the cabinet 14.

The infeed conveyor 18 next conveys the product 12 past the sensors 79-88 to sense the presence, size and shape of the product 12 for selecting an approximately-sized shelf 16 on which to store the product 12. If the ID on the scanned product does not match an ID in the Drug Package Table, the control system 24 displays a message such as "unrecognized product" on the display 164. The operator may then edit the Drug Package Table to add information for the product 12 or may attempt to load a different product.

The above loading procedures can be performed for several products 12 before any of the products 12 are stored on the shelves 16. As each product 12 is loaded, the infeed conveyor 18 advances to the right as viewed in FIG. 1 to make room for additional products. The number of products that can be loaded into the cabinet 14 before the products 12 are stored on the shelves 16 is limited only by the number of products that can fit on the infeed conveyor 18.

Storing

Once a product 12 or products have been successfully loaded onto the infeed conveyor 18, an operator may initiate a product storing mode. In the storing mode, the control system 24 first identifies a shelf 16 on which to store a product and then directs the transporter 22 and ram assembly 90 to remove the product 12 from the infeed conveyor 18 and to transport the product 12 to the selected shelf 16.

The controller 158 first accesses the Conveyor Product Table, Drug Package Table, and Shelf Table to attempt to locate an appropriate shelf 16. For example, the controller 158 first attempts to locate the smallest shelf 16 where the product 12 fits that also contains only products having the same package ID and that also has the fewest number of products stored thereon.

If such a shelf 16 is not found, the controller 158 attempts to find the smallest size shelf 16 where the product 12 fits that is also empty. If such a shelf 16 is not found, the controller 158 attempts to find the smallest sized shelf 16 having a product 12 with the same ID at the front, a maximum number of products with the same ID, and the fewest number of products thereon.

If such a shelf 16 is not found, the controller 158 attempts to find the smallest sized shelf 16 where the product 12 fits that also has the same product at the front and the best compatible dimensions and the smallest number of packages stored thereon. If such a shelf 16 is not found, the controller 158 attempts to find the smallest sized shelf 16 where the product 12 fits that also has the best compatible dimensions and the smallest number of packages thereon.

The compatible dimensions referred to above are the dimensions that will not cause two disproportionate products to be stacked against each other (otherwise, they may skew on the shelf 16). The operator can define the compatible dimensions. For example, the operator may define disproportionate to be 25% so that products that are 25% different in dimensions will not be stacked against one another.

Once a shelf 16 is found for storing a product, the controller 158 adds an entry to the Conveyor Product Table for the product. The shelf ID in the table is set to the ID of the shelf found. The controller 158 then directs the ram assembly 90 and transporter 22 to move the product 12 to the selected shelf 16. Specifically, the transporter 22 is positioned with the tines 130 adjacent the infeed conveyor 18, such that the product 12 is between the ram assembly 90 and the tines 130. Then, the ram assembly 90 pushes the product 12 from the infeed conveyor 18 and onto the tines 130. Then, the drive assembly 126 repositions the transporter 22 adjacent the selected shelf 16. As the control arm 134 is rotated rearwardly, moving the tines 130 toward the selected shelf 16, the drive assembly 126 raises the transporter 22, thereby horizontally sliding the tines 130 and the product 12 over the selected shelf 16. With the product 12 slightly above the selected shelf 16, the drive assembly 126 lowers the transporter 22, such that the tines 130 fall between the vertical walls 56 of the selected shelf 16, thereby resting the product 12 on the vertical walls 56 of the selected shelf 16. Finally, the drive assembly 126 further lowers the transporter 22 as the control arm 134 is rotated forwardly away from the rear wall 30, thereby horizontally sliding the tines 130 from between the product 12 and the plate 52. Once the tines 130 have cleared the shelves 16, the transporter 22 can be used to retrieve another of the products 12.

Once the product 12 is successfully moved to the shelf 16, the depth or Z_ordinal field is set to indicate the depth of the product 12 on the shelf 16. The conveyor location field in the Conveyor Product Table is set to Infeed when the product 12 is on the infeed conveyor 18. The field will change to Transport when the product 12 is successfully moved to the transporter 22. The field will change to Shelf when the product 12 is successfully transferred to a shelf 16.

If the system 10 is in the middle of a storing routine and it receives a command to load a product, the infeed conveyor 18 will have to move the products 12 back to the left so that only one product is in front of the ram.

Dispensing

Products 12 are dispensed from the cabinet 14 in response to scripts received by the control system 24 from the host computer 26. The controller 158 analyzes a received script and accesses the Conveyor Product Table to locate a product or products to fill the script.

The controller 158 first accesses the Conveyor Product Table to search for a product 12 to fill the script. For example, the controller 158 may first attempt to locate any products that fill the script that are also about to expire. If such a product or products are found, the controller 158 attempts to locate a product or products with: the earliest expiration date; that are the closest to the front of a shelf 16; and that are on a shelf 16 of the smallest width and having the smallest clearance height.

If a product 12 that is about to expire is not found, the controller 158 attempts to locate a product or products that fill the script that are at the front of a shelf 16. If no such product or products are found, however, the controller 158 attempts to locate a product or products which is the least deep on a shelf 16, which has the earliest expiration date, which is on the smallest width shelf 16, which is on the shelf 16 with the least height clearance, and which is closest to the transporter 22.

The controller 158 attempts to deliver the least number of products needed to fill a particular script. For example, if a script requires 50 units of a particular product and the cabinet 14 has two boxes each containing 25 units of the products and a single box containing 50 units of the product, the controller instructs the transporter 22 to retrieve the 50-count box rather than the two 25-count boxes.

Once a product or products have been selected by the controller 158, the controller directs the transporter 22 to retrieve the product or products from the appropriate shelves 16 and to deliver the product or products to the outfeed conveyor 20 for delivery to the operator. Specifically, the transporter 22 is positioned with the tines 130 adjacent the appropriate shelf 16. The drive assembly 126 raises the transporter 22 as the control arm 134 is rotated rearwardly toward the rear wall 30, thereby horizontally sliding the tines 130 between the product 12 and the plate 52 and between the vertical walls 56 supporting the product 12 of the appropriate shelf 16. The drive assembly 126 further raises the transporter 22, such that the tines 130 rise above the vertical walls 56 of the appropriate shelf 16, thereby lifting the product 12 off the vertical walls 56. With the product 12 slightly above the appropriate shelf 16, the drive assembly 126 lowers the transporter 22, as the control arm 134 is rotated forwardly, moving the tines 130 away from the rear wall 30, thereby horizontally sliding the tines 130 and the product 12 from over the appropriate shelf 16. Once the tines 130 clear the shelves 16, the drive assembly 126 repositions the transporter 22 slightly above the outfeed conveyor 20. The drive assembly 126 lowers the transporter 22 to just above the outfeed conveyor 20, such that the pegs 121 extend between and above the tines 130 and between the product 12 and the backplate 132. Then, the drive assembly 126 further lowers the transporter 22 as the control arm 143 is rotated forwardly, thereby horizontally sliding the tines 130 across the outfeed conveyor 20. As the tines 130 slide outwardly, the pegs 121 contact the product 12 and prevent the product 12 from sliding with the tines 130. As the tines 130 clear the pegs 121, the product 12 drops onto the outfeed conveyor 20, which may then convey the product 12 outside the cabinet 14 to the operator.

The operator then scans or manually enters the ID on the product 12 to ensure that the proper product has been dispensed. The control system 24 then updates the tables to indicate that the product or products have been dispensed and prints a prescription label for the product. The operator applies the label to the product 12 and delivers it to a patient in a conventional manner.

The system 10 may need to rotate products 12 on the shelves 16 to retrieve a product that is needed to fill a script. For example, if a product needed to fill a script is not at the front of one of the shelves 16, the system 10 must move all of the products in front of the needed product 12 to another shelf 16 reserved for rotation. The products 12 that are temporarily moved may then be moved back to their original shelves after the desired product has been dispensed.

An operator may modify an expiration date of a product that is stored in the cabinet 12 by accessing the Conveyor Product Table and changing the entered expiration date. The operator can modify other fields within the table in a similar manner.

Maintenance

The maintenance mode allows an operator to eject selected products 12 from the cabinet 14. The control system 24 allows an operator to eject all of the products 12 from a shelf 16, eject a particular product on one of the shelves 16, eject all products within the cabinet 14, eject only expired products, or eject all products whose loading date is less than some specified date.

The controller 158 determines which products are to be ejected and then instructs the transporter 22 to place all specified products on the outfeed conveyor 20. The outfeed conveyor 20 then transports the ejected products to the operator. The control system display 164 may indicate which products need to be ejected before the ejection process begins.

Second Embodiment

Figure 12:
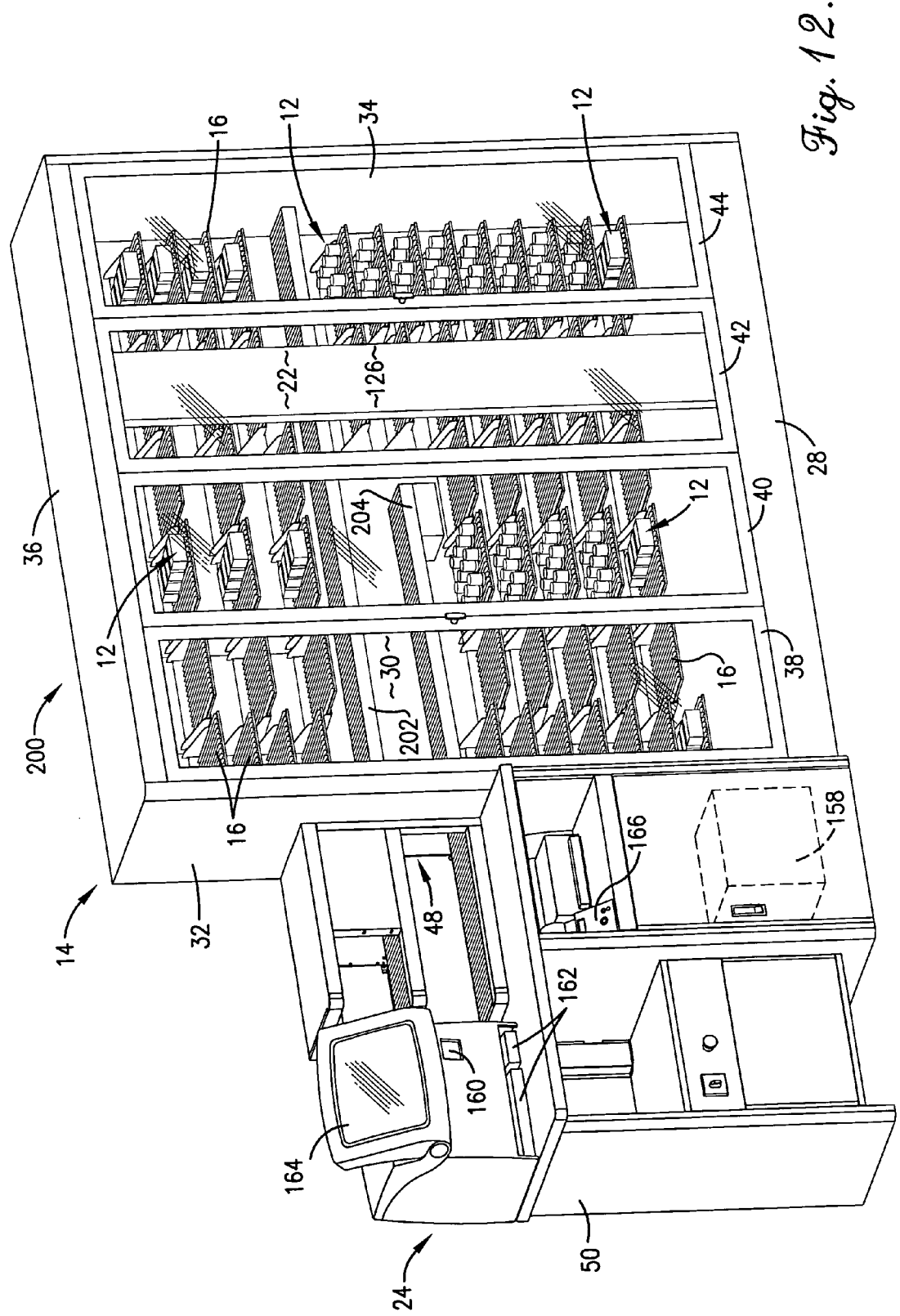
FIG. 12 is a perspective view of a medicament dispensing system constructed in accordance with a second embodiment of the present invention.

Turning now to FIG. 12, a medicament storage and dispensing system constructed in accordance with principles of a second embodiment of the invention is illustrated and designated generally by the reference numeral 200. The system 200 is similar in structure and operation to the system 10 described above, therefore only substantial differences will be described. Reference numerals identifying elements of the system 10 will also be used with elements of the system 200 that are common to both systems.

The system 200 is distinguished from the system 10 primarily by an infeed/outfeed mechanism that includes an infeed conveyor 202 and an outfeed conveyor 204. The infeed conveyor 202 and outfeed conveyor 204 are similar to the infeed conveyor 18 and outfeed conveyor 20, respectively, except that the infeed conveyor 202 and the outfeed conveyor 204 present ribbed surfaces. The ribbed surfaces enable the transporter 22 to pick up and deposit products without the need for pegs, such as pegs 121 described above, or a ram assembly, such as the ram assembly 90 described above.

Figure 13:
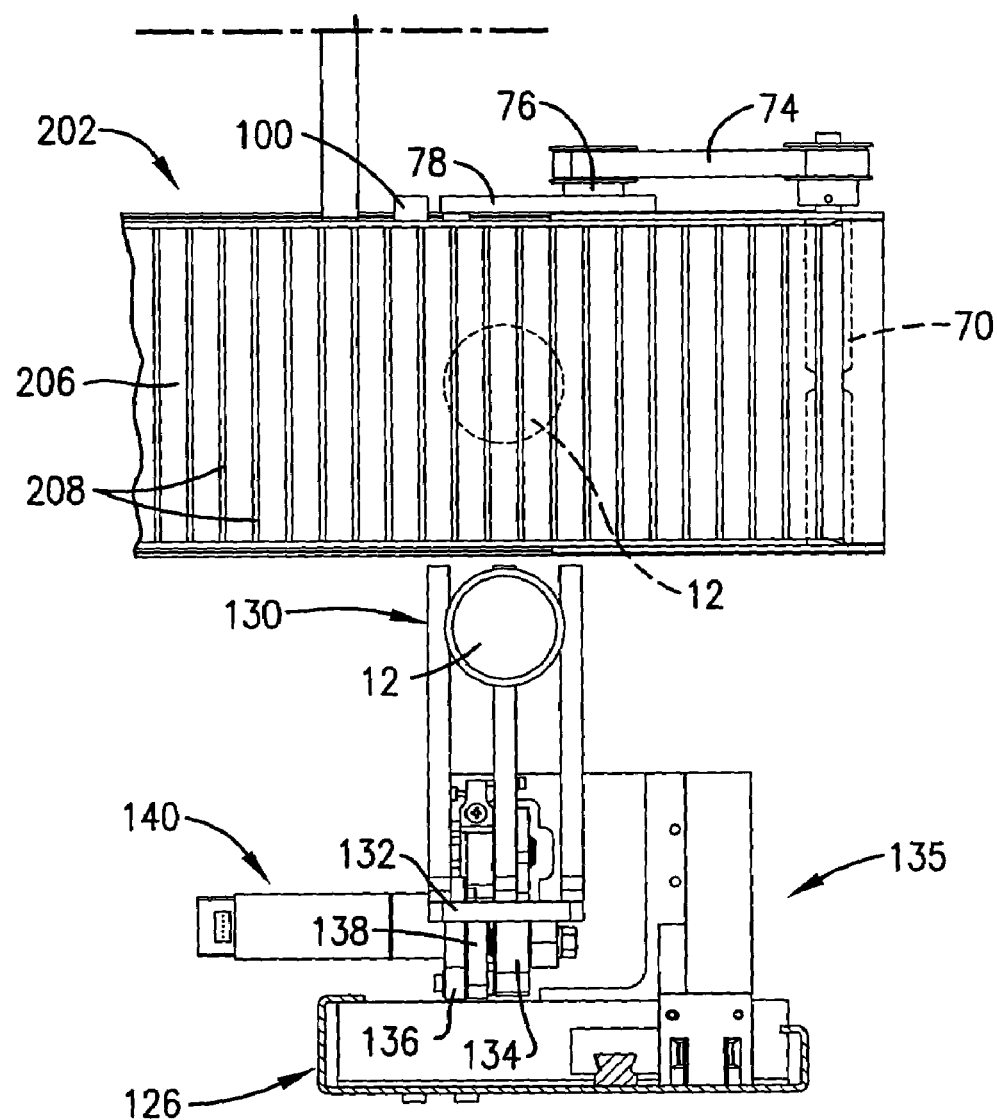
FIG. 13 is a fragmentary plan view of an infeed conveyor of the system of FIG. 12, showing transfer of a product from the infeed conveyor to a transporter.

Referring now to FIG. 13, the infeed conveyor 202 is shown in greater detail. The infeed conveyor 202 includes a conveyor belt 206 with a ribbed surface. A plurality of conveyor belt ribs 208 extend perpendicularly with respect to the rear wall 30 of the cabinet 14. The ribs 208 are also preferably approximately one quarter inch tall and uniformly spaced approximately one quarter inch apart. The ribs 208 are preferably one sixteenth of an inch thick, but may vary in thickness depending on the required strength resulting from expected product weight. The ribs 208 are preferably integrally formed with the conveyor belt 206 and therefore may be made of rubber, plastic, nylon, an elastomer, or other flexible material. Alternatively, the ribs 208 may be formed separately from the conveyor belt 206 and subsequently attached thereto, and the ribs 208 may be made of a substantially rigid material, such as metal.

When a product 12 is loaded into the cabinet 14, the product is scanned, placed on the infeed conveyor 202, and carried into the cabinet 14 on the conveyor belt 206 as described above in relation to the system 10. The conveyor belt 206 carries the product 12 into the cabinet 14 to a location near a shelf where the product 12 will be placed. The transporter 22 approaches the conveyor belt 206 so that the tines 130 are aligned with spaces between the ribs 208, as illustrated in FIG. 13. The tines 130 are slid horizontally between the ribs 208 and below the product 12 without disturbing the product 12. The system 200 then raises the tines 130 above the ribs 208 by raising the mounting plate 135 using the drive assembly 126, thereby lifting the product off the conveyor belt 206.

Referring now to FIGS. 14-15, the outfeed conveyor 204 is shown in greater detail. The outfeed conveyor 204 includes a conveyor belt 210 with a ribbed surface substantially identical to the belt 206 of the infeed conveyor 202 described above. As can be seen by comparing FIGS. 1 and 2, the outfeed conveyor 204 extends further into the cabinet 14 than the outfeed conveyor 20 of the system 10, described above. Extending the reach of the outfeed conveyor 204 in this manner expedites the product dispensing process, as explained below. While the outfeed conveyor 204 is shown and described as extending partially into the cabinet 14, it will be appreciated that the outfeed conveyor 204 may extend substantially to the right side wall 34 of the cabinet 14.

When a product is dispensed, the controller directs the transporter 22 to retrieve the product or products from the appropriate shelves 16 and to deliver the product or products to the outfeed conveyor 204 for delivery to the operator. The transporter 22 retrieves a product from a shelf 16 as described above. The transporter then deposits the product on the conveyor belt 210 of the outfeed conveyor 204 by positioning the tines 130 above and between ribs 212 of the conveyor belt 210. As the tines 130 are lowered between the ribs 212, the product 12 is deposited upon the conveyor belt 210. The tines 130 are then horizontally withdrawn from the conveyor belt 210 below the product 12. Once the tines are withdrawn, the conveyor belt 210 is rotated to carry the product 12 out of the cabinet 14.

From the foregoing it is apparent that the system 200 eliminates the need for the ram assembly 90 and the pegs 121. Thus, in the system 200, the transporter 22 can place the product 12 on the outfeed conveyor 204 and retrieve the product 12 from the infeed conveyor 202 at any point along the respective conveyor. Referring again to FIG. 12, the transporter 22 may retrieve the product 12 from the infeed conveyor 202 near the left side wall 32, near the right side wall 34, or at any point between the left side wall 32 and the right side wall 34. Enabling they transporter 22 to interact with the conveyors 202,204 at any point expedites the processes of loading and dispensing products 12. For example, the transporter 22 may retrieve a product from the infeed conveyor 202 near a shelf where the product 12 will be stored, and may place a product 12 on the outfeed conveyor 204 near a shelf where the product 12 had been stored, thus reducing unnecessary travel by the transporter 22. It will be appreciated that this functionality not only saves time, but also reduces wear on the transporter 22.

The controller 158 tracks a location of the product 12 on the infeed conveyor 202 in order to direct the transporter 22 to the location of the product 12 for product 12 retrieval. For example, the controller 158 initially receives location information from one or more of the sensors 79-88 as the product is carried into the cabinet 14 on the infeed conveyor 202. As the conveyor 202 carries the product 12 into the cabinet, the controller 158 tracks the location of the product 12 using, for example, a speed of the conveyor belt 206 and a time the belt 206 has been rotated. When the controller 158 determines that the product 12 is near a shelf on which it will be placed, the controller 158 stops the belt and activates the transporter 22 to move the product 12 from the infeed conveyor 202 to the product 16, as described above.

Although the invention has been described with reference to the preferred embodiment illustrated in the attached drawing figures, it is noted that equivalents may be employed and substitutions made herein without departing from the scope of the invention as recited in the claims. For example, although the storage and dispensing systems 10 and 20 of the present invention include separate infeed and outfeed conveyors 18,20 and 202,204, respectively, the functions of the two conveyors may be performed by a single, bi-directional infeed/outfeed conveyor assembly. Or, the infeed and outfeed conveyors 18,20 and 202,204 may be eliminated entirely, and products 12 may be manually placed on the shelves 16. Similarly, the infeed conveyors 18,202 and outfeed conveyors 20,204 may be replaced with equivalent mechanisms operable for holding and moving products within the cabinet 14. Additionally, although the systems 10,200 of the present invention are particularly useful for storing and dispensing pharmaceutical products, they may also be used for storing and dispensing other products and goods. Furthermore, rather than the control arm 134 being driven directly by the motor 140, the systems 10,200 may include interposing gears. Such gears may increase accuracy of the transporter 22 and amplify the motor's 140 torque.

Finally, the dimensions and/or materials discussed herein may be modified to suit particular applications. For example, the tines 130 may be up to approximately three-quarters of an inch wide. Specially, many bottles used to hold pills are approximately one inch in diameter. Since such a bottle would require at least two vertical walls 56 and two ribs 208,212 for support, and the vertical walls 56 and ribs 208, 212 must have some width, the tines 130 must be less than one inch wide, at least in this case. Of course, if the system 10,200 is to strictly be used with larger packages, the tines 130 could be wider. However, this is likely unnecessary and is not consistent with the preferred embodiment. On the other end of the spectrum, the tines 130, along with the separation between the vertical wall 56 and ribs 208,212, may be very narrow. These and other minor modifications are within the scope of the present invention.

The invention claimed is:

1. A storage and dispensing system for storing and dispensing products, the system comprising:
 a cabinet including a front wall, a rear wall, a left sidewall, a right sidewall, and a top wall that together substantially enclose the cabinet and prevent unauthorized access therein, wherein the rear wall of the cabinet includes a series of mounting slots arranged in row and column configuration;

a plurality of shelves mounted within and substantially enclosed by the cabinet, each shelf having a plurality of substantially vertical walls configured for holding at least one product thereon, wherein each of the shelves is mounted within certain ones of the mounting slots and may be removed and mounted to other ones of the mounting slots to reconfigure placement of the shelves within the cabinet;

an infeed conveyor for receiving products that are to be stored in the cabinet, wherein the infeed conveyor presents a ribbed conveying surface;

an outfeed conveyor for receiving products that are to be dispensed from the cabinet, wherein the outfeed conveyor presents a ribbed conveying surface; and a single transporter enclosed by and moveable within the cabinet for transporting the products from the infeed conveyor to the shelves and from the shelves to the outfeed conveyor, the transporter including— a plurality of tines operable to move the products placed thereon to the shelves and to remove the products from the shelves, wherein the tines mate with the ribbed conveyor surfaces of the infeed and outfeed conveyors, and wherein the tines mate with the vertical walls of the plurality of shelves, a control arm for controlling the position of the tines, a motor for rotating the control arm, thereby moving the tines, a brace operable to hold the tines in a substantially horizontal orientation as the control arm is rotated, and wherein the tines slide between the vertical walls and are lifted above the shelf in order to remove the products from the shelves.

2. The system as set forth in claim 1, further including a plurality of sensors coupled with the infeed conveyor for sensing a physical attribute of products placed on the infeed conveyor.

3. The system as set forth in claim 1, wherein the tines are operable to move products placed thereon to product shelves, and to remove products from the shelves.

4. The system as set forth in claim 1, further including a control system for controlling operation of the infeed conveyor, the outfeed conveyor, and the transporter.

5. The system as set forth in claim 4, the control system including a controller, a display, an input device, a scanner, and a label printer.

6. The system as set forth in claim 4, wherein the control system determines a shelf from the plurality of shelves on which to place a product, activates the infeed conveyor to carry a product into the cabinet, deactivates the infeed conveyor when the product is proximate the shelf, and drives the transporter to remove the product from the infeed conveyor and place the product on the shelf.

7. The system as set forth in claim 1, wherein the tines slide between the ribs of the infeed/outfeed mechanism and are lifted above the ribs to remove products from the mechanism, and wherein the tines are lowered from above the ribs into a position between the ribs and slid between the ribs to place a product on the mechanism.

* * * * *